Figure 1:
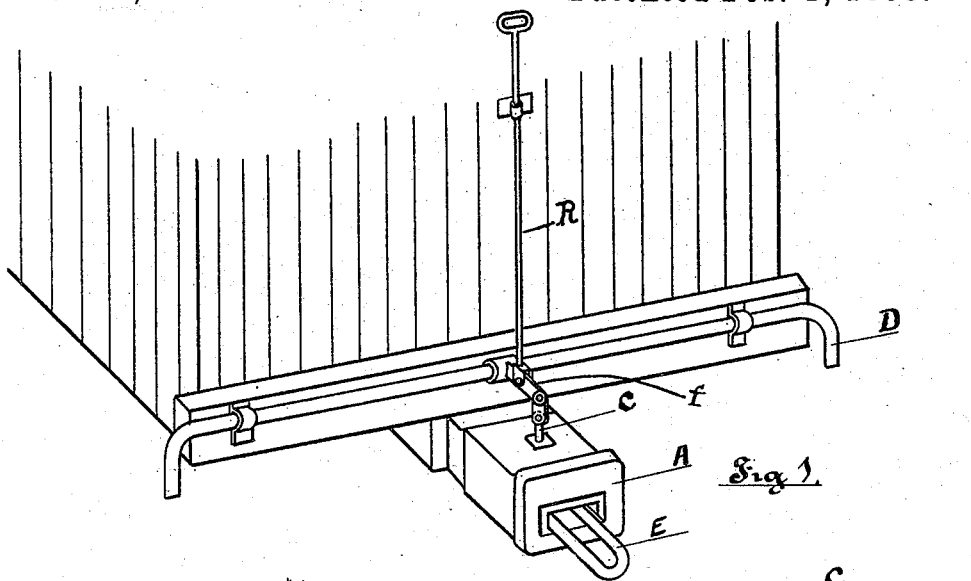

(No Model.)

A. FINNIE.
CAR COUPLING.

No. 598,244. Patented Feb. 1, 1898.

Witnesses
Geo. H. Richter.
John B. Claypool.

Inventor
Alexander Finnie
Per L. W. Woodworth
Attorney.

THE NORRIS PETERS CO., PHOTO-LITHO., WASHINGTON, D. C.

UNITED STATES PATENT OFFICE.

ALEXANDER FINNIE, OF YOUNGSTOWN, OHIO.

CAR-COUPLING.

SPECIFICATION forming part of Letters Patent No. 598,244, dated February 1, 1898.

Application filed September 27, 1894. Serial No. 524,221. (No model.)

*To all whom it may concern:*

Be it known that I, ALEXANDER FINNIE, a citizen of the United States, residing at Youngstown, in the county of Mahoning and State of Ohio, have invented certain new and useful Improvements in Car-Couplers; and I do hereby declare the following to be a full, clear, and exact description of my invention, such as will enable others skilled in the art to which it appertains to make and use the same, reference being had to the accompanying drawings, which form part of this specification.

My invention relates to that class of car-couplers that are termed "automatic" and employ a link; and its object is such a means for coupling, adapted to both freight and passenger cars operated by steam-power, that is simple, cheap, and durable and that in use will in every situation couple automatically by impact and that may be uncoupled without the necessity of the men going between the car ends, thus providing a car-coupler combining all of the desirable and none of the inconvenient and dangerous qualities of the old-style link-and-pin or of those of the "vertical-plane" type. I accomplish this object by the device hereinafter described, and illustrated in the drawings, in which—

Figure 2:
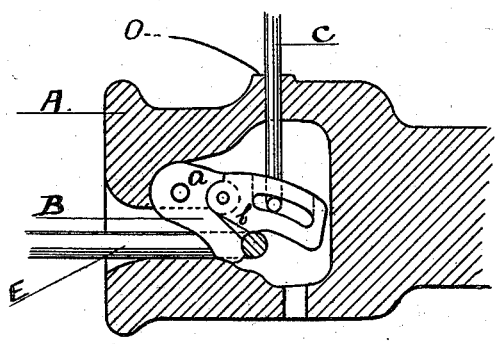
Figure 3:
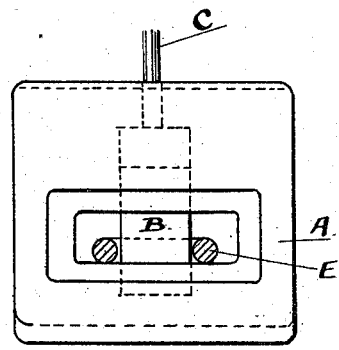
Figure 4:
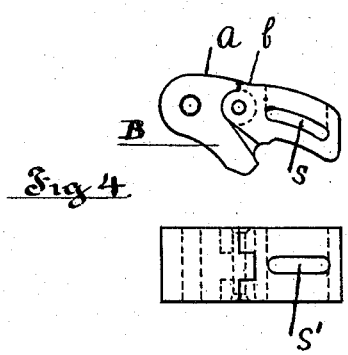
Figure 5:
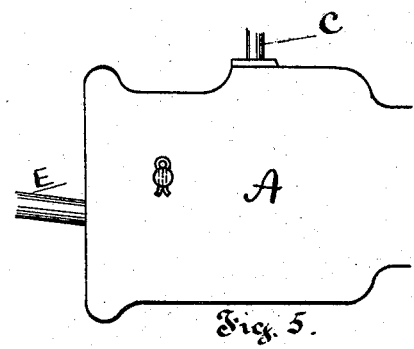

Figure 1 is a perspective view of a lower portion of a box-car end provided with my coupler. Fig. 2 is a longitudinal vertical sectional view of a forward portion of the draw-head A, showing the forms of its interior spaces, with side views of the dog B and of sections of the rod C and link E in place therein. Fig. 3 is a forward end view of the draw-head A, showing in dotted lines the cross-sectional form of its interior space and the parts shown at Fig. 2. Fig. 4 is a group showing a side view and a top view of the dog B, and Fig. 5 is a side view of the draw-head A.

Similar letters refer to similar parts in all views.

It will be seen that in exterior form my draw-head A does not essentially differ from the old-style link-and-pin draw-head, the draw-bar that is integral with it (not shown in the drawings) being similar. Its interior spaces are such as to accommodate and permit the movement of the parts that act within them. It will be seen at Figs. 1 and 2 that the space in which the dog B acts is rounded on its longitudinal and straight on its vertical lines, presenting in its upper portion a chamber in which the dog B moves, when uncoupling takes place, to a position above the upper wall of the forward or entrance portion and presenting also in its lower portion a similar chamber for space for the rear end of the dog B when the coupling is formed. The opening O is for the rod C. A suitable lift appears on the bottom of the space at the mouth of the larger portion for a purpose that will presently be shown.

The dog B is formed of the two coöperating parts $a$ and $b$, both of which are straight on their vertical side lines. The part $a$ is horizontally half-rounded in its upper and larger portion and is socketed within a recess in the upper forward portion of the larger interior space, being therein pivoted by a suitable transverse pin, while the lower portion has brace against the forward walls of the lower part of the larger interior space. The part $b$ forwardly presents a horizontally-half-rounded portion with a shoulder above for pivot within a socket-like recess in the upper portion of the part $a$, having also a shoulder above, so that the upward movement of the part $b$ is checked at the proper point and the connection of the two parts becomes rigid. Rearward there appears the slot $s$, passing on slightly-concave lines horizontally through the body of the part with closed ends, and in the upper portions the straight slot $s'$ communicating with the slot $s$. These slots are for a purpose that will presently appear.

The rod C, having at its lower end a boss moving within the slot $s$ to retain it within the slot $s'$, extends upward, having a pivotal mortise-joint connection a little above the draw-head A with a short rod, which has like connection at its upper end with the finger $f$ of the rod D, so that the forward-and-backward movement of the draw-bar will not disturb the perpendicular of the rod C.

If preferred, the pivotal mortise-joint may be dispensed with, a similar result being attained by an eye in the upper end of the rod C, through which the finger $f$ may freely pass with the movement of the draw-head.

The rod D is a suitable rod extending across the car end a little above the draw-head, held rotatively thereto by staples or similar means, the ends terminating in crank-handles immediately outward from the car side.

The finger $f$ is a rod of suitable length, at one end rigidly attached near the center of the rod D, the other pivotally jointed with the short rod that is connected with the rod C.

The rod R, used on box-cars, extends vertically from a pivotal connection with the finger $f$ to the car-roof, terminating in a suitable handle, it being retained to the car end by staples or other suitable means, a boss at the proper point above one of the staples preventing its descent below the point the rod reaches when the coupling is formed. In its lower end it presents a mortise, in which the finger $f$ has place with a cross-bolt beneath, through which said finger slides with the movement of the draw-bar.

It will be understood that my coupler must be made of suitable material, steel being required for the dog B and steel or malleable iron preferred for the draw-bar.

The mechanism and operation of my car-coupler will now be understood and its usefulness in accomplishing the object stated in the beginning of this specification will be appreciated.

As two draw-heads approach each other the link in one, guided to place by the incline in the mouth of the other, pushes upward the rear portion of the part $a$ of the dog B and passes to place, whereupon gravity causes said portion to drop downward again within the sides of the link and the coupling is formed automatically. It is to be observed that the dog is not held by a pivot-pin, but by ample bearings in the socket-spaces at both ends, so that breakage by stress is impossible, the parts being of suitable material and bulk. To uncouple, the vertical rod C is lifted, raising that part of the dog B that is within the link above it, freeing the link, and this movement is effected from either car side by partially rotating the rod D, the finger $f$ of which lifts the rod C, or from the car-roof of a box-car by lifting the rod R, which does the same thing. From the same position the trainmen may elevate the forward end of the link to enter it into a draw-head that is higher by depressing the vertical rod C, causing the part $b$ of the dog B to press upon the rear portion of the link, tilting the forward end upward by means of a fulcrum near its length-center, formed by the lift described.

I am aware that dogs within draw-heads and that both transverse and vertical rods upon car ends are known; but I am not aware that my device, above described, as a combination of parts was ever known or used prior to my invention thereof.

What I claim is—

1. In combination with a draw-head, the link therefor, the seat for the said link, the dog pivoted within the said draw-head and with ends adapted when holding the link in place to engage sockets in the draw-head, the said sockets, the double-slotted link pivoted to the said dog, means for actuating the said dog pivotally secured in the said slots, and a stop whereby the said link catches the dog in its upward movement, and raises the same, substantially as described.

2. The car-coupler consisting of a draw-bar provided with the draw-head A having in its interior, rearward of the mouth, spaces above and below the horizontal lines of the narrowest portions of the entrance-openings, and the vertical opening O in its upper walls; the dog B formed of the parts $a$ and $b$, the former at the higher end pivoted within a socket-like recess in the upper portion of the draw-head A while its lower portion has brace against the forward wall of the lower interior space of said draw-head, and the latter at its forward end pivoted to the rear side of the upper portion of the former with an angular shoulder above the pivot meeting a similar shoulder in the former, and having the longitudinal and vertical slots $s$ and $s'$; the rod C having at its lower end a boss movable within the slot $s$ and extending upward to a pivotal mortise-joint connection with a short rod which is similarly connected with the finger $f$ of the rod D; and the transverse rod D rotatively attached to the car end, its ends having crank-handles outward from the car side, and having centrally the forwardly-projecting, rigidly-attached finger $f$; all substantially as described and for the purpose expressed.

In testimony whereof I hereunto affix my signature in the presence of two witnesses.

ALEXANDER FINNIE.

Witnesses:
ANDREW LAWTON,
W. H. BENSON.